H. N. SUMMERS & C. M. COOPER.
HAND TOOL FOR EXTRACTING RIVETS.
APPLICATION FILED SEPT. 22, 1908.
936,580.
Patented Oct. 12, 1909.
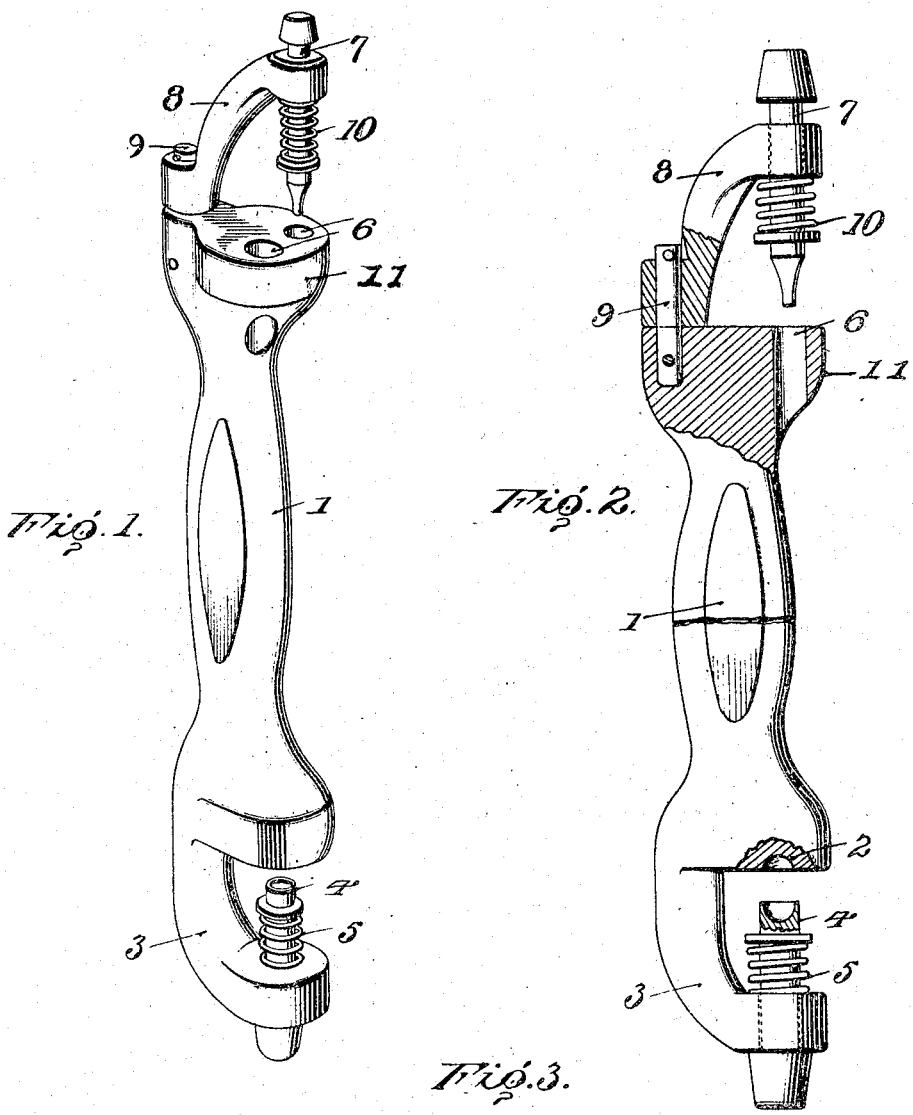

UNITED STATES PATENT OFFICE.

HENRY N. SUMMERS AND CHARLES M. COOPER, OF ERICK, OKLAHOMA.

HAND-TOOL FOR EXTRACTING RIVETS.

936,580.

Specification of Letters Patent. Patented Oct. 12, 1909.

Application filed September 22, 1908. Serial No. 454,200.

*To all whom it may concern:*

Be it known that we, HENRY N. SUMMERS and CHARLES M. COOPER, citizens of the United States, residing at Erick, in the county of Beckham and State of Oklahoma, have invented certain new and useful Improvements in Hand-Tools for Extracting Rivets, of which the following is a specification.

The present invention comprehends certain new and useful improvements in hand tools for extracting rivets, or the like, and the invention has for its object an improved device of this character which is practically designed for removing broken rivets from the sockets of the bows of vehicle tops; which may be expeditiously handled and operated by one person; and which embodies a novel arrangement of parts, whereby it is rendered particularly efficient and also quite simple and durable.

With this and other objects in view that will more fully appear as the description proceeds, the invention consists in certain constructions and arrangements of the parts that we shall hereinafter fully describe and then point out the novel features of in the appended claim.

For a full understanding of the invention and the merits thereof and also to acquire a knowledge of the details of construction, reference is to be had to the following description and accompanying drawing, in which:

Figure 1 is a perspective view of a tool constructed in accordance with our invention; Fig. 2 is a side view thereof, parts being shown in section; and, Fig. 3 is an end view with the supporting arm for the punch in section.

Corresponding and like parts are referred to in the following description and indicated in all the views of the drawing by the same reference characters.

Our improved tool consists essentially of a handle bar or stock 1 which is preferably cast or otherwise suitably formed of metal and which is relatively long and substantially straight, so as to be susceptible of being firmly grasped in the hand of a workman. At one end the handle bar is formed with a lateral enlargement 11, the outer end face of which is flat and constitutes an anvil. The enlargement has two adjacent openings 6 of different sizes that extend entirely therethrough at points beyond and in close proximity to the periphery of the handle bar 1. Each of these openings is parallel to the axis of the handle bar and is substantially straight and of uniform diameter throughout its length, whereby to admit of rivets being driven freely through the openings and ejected therefrom, without the danger of becoming lodged therein. This arrangement is also advantageous in that the enlargement may be easily and cheaply cast with the openings therein.

A pivot post 9 is seated in a socket in the enlargement on the opposite side of the axis of the handle bar from the adjacent openings 6, and is retained therein by a pin or like fastening means. The pivot post is disposed longitudinally and projects beyond the anvil to constitute a journal on which one end of a supporting arm 8 is rotatably mounted, the arm being retained on the post by a removable pin or the like. The arm is extended longitudinally outwardly with its free end spaced apart from the anvil and formed with an aperture in which a longitudinal drift punch 7 is slidably mounted. The punch is normally held in retracted position by a coil spring 10 and is adapted to be brought into longitudinal alinement with either selected one of the openings 6 by turning the arm 8 about the pivot post. The outer end of the punch is headed, as shown, to receive blows from a hammer.

In the practical use of the tool, the anvil is placed against the buggy bow, so that the required opening 6 registers with the rivet to be extracted. The arm 8 is then turned so as to bring the drift punch in alinement with the rivet, whereupon blows are delivered upon the head of the punch to project the same longitudinally toward the anvil and drive the rivet out of the bow socket and into the said opening 6, the continued movement of the punch positively ejecting the rivet from the opening without the liability of the former becoming lodged in the latter. The ejected rivet passes through the enlargement 11 beyond and in close proximity to the handle bar, and attention is particularly directed to the fact that the peripheral walls of the handle bar diverge away from the enlargement, as best seen in Fig. 2, so as to serve, when the tool is held in an upright position, to deflect the ejected rivet outwardly.

From the foregoing description in connection with the accompanying drawing it will be apparent that we have provided an improved rivet extracting device which is particularly efficient in operation; which may be easily and cheaply manufactured and is not likely to get out of order; and which embodies to a marked degree the characteristics of simplicity, durability and strength. Furthermore, it is to be noted that by connecting the supporting arm to the anvil on the opposite side of the axis of the handle bar from the adjacent openings, the strain incident to the operation of the tool is more effectually distributed, thereby increasing the life of the tool.

For convenience we have equipped the opposite end of the handle bar with a device for heading rivets. For this purpose the said end of the handle bar is preferably enlarged, as shown, and is formed in its outer face with a depression 2, and also with an arm 3, the arm being extended longitudinally with its outer end turned laterally. A set punch 4 is slidably mounted in the outer end of the arm in longitudinal alinement with the depression 2 for coöperation therewith, the set punch being movable under the influence of a coil spring 5.

Having thus described the invention what is claimed as new is:

The herein described hand tool for extracting rivets, comprising a substantially straight handle bar formed at one end with a lateral enlargement having a flat terminal face constituting an anvil, said enlargement being formed with adjacent straight openings of different diameters extending longitudinally entirely therethrough at points beyond the periphery of the handle bar, an arm pivotally connected at one end to the anvil on the opposite side of the axis of the handle bar from said openings and free to turn about an axis parallel to the latter and centered with respect thereto, the free end of the arm being extended outwardly in spaced relation to the anvil and being movable into longitudinal alinement with either selected one of the openings, and a longitudinally disposed drift punch slidably mounted in the free end of the arm.

In testimony whereof we affix our signatures in presence of two witnesses.

HENRY N. SUMMERS. [L. S.]
CHARLES M. COOPER. [L. S.]

Witnesses:
J. W. RICHARDSON,
J. W. DAVIS.